United States Patent
Hao et al.

(10) Patent No.: US 8,623,938 B2
(45) Date of Patent: Jan. 7, 2014

(54) INKJET INK AND METHOD FOR MAKING THE SAME

(75) Inventors: Hai-Yan Hao, Beijing (CN); Bing-Chu Du, Beijing (CN); Chun-Hai Zhang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 197 days.

(21) Appl. No.: 13/224,528

(22) Filed: Sep. 2, 2011

(65) Prior Publication Data

US 2012/0172496 A1     Jul. 5, 2012

(30) Foreign Application Priority Data

Dec. 31, 2010   (CN) .......................... 2010 1 0619664

(51) Int. Cl.

| | |
|---|---|
| A61K 9/16 | (2006.01) |
| B41J 2/01 | (2006.01) |
| B41J 2/17 | (2006.01) |
| B41J 2/175 | (2006.01) |
| B60C 1/00 | (2006.01) |
| C04B 28/26 | (2006.01) |
| C08F 8/30 | (2006.01) |
| C08K 3/04 | (2006.01) |
| C08K 3/34 | (2006.01) |
| C08K 5/06 | (2006.01) |
| C08K 11/00 | (2006.01) |
| C08L 33/06 | (2006.01) |
| C08L 39/00 | (2006.01) |
| C09B 67/00 | (2006.01) |
| C09D 5/00 | (2006.01) |
| C09D 11/00 | (2006.01) |
| C09D 11/10 | (2006.01) |
| G01D 11/00 | (2006.01) |

(52) U.S. Cl.
USPC .... 523/160; 106/31.13; 106/31.6; 106/31.85; 106/31.89; 106/31.92; 347/1; 347/85; 347/95; 347/100; 523/161; 523/333; 524/377; 524/442; 524/495; 524/496; 524/543; 524/555; 524/556; 524/560

(58) Field of Classification Search
USPC .......... 523/160, 161, 333; 524/377, 442, 495, 524/496, 543, 555, 556, 560; 106/31.13, 106/31.6, 31.85, 31.89, 31.92; 347/1, 85, 347/95, 100
See application file for complete search history.

(56) References Cited

U.S. PATENT DOCUMENTS

| | | |
|---|---|---|
| 2003/0001487 A1 | 1/2003 | Lee |
| 2006/0189113 A1 | 8/2006 | Vanheusden et al. |
| 2009/0152509 A1* | 6/2009 | Choi et al. ..................... 252/511 |
| 2010/0000441 A1* | 1/2010 | Jang et al. .................. 106/31.13 |

FOREIGN PATENT DOCUMENTS

TW     201029536     8/2010

\* cited by examiner

Primary Examiner — Patrick Niland
(74) Attorney, Agent, or Firm — Altis Law Group, Inc.

(57) ABSTRACT

An inkjet ink includes carbon nanotubes, flake graphites, an organic carrier, a binder, a surfactant, a film enhancer and a solvent. A method for making an inkjet ink includes dispersing the plurality of carbon nanotubes in the surfactant solvent to form a first mixture, dispersing the plurality of flake graphites in the organic carrier solvent to form a second mixture, adding the film enhancer into the second mixture to form a third mixture, and mixing the first mixture and the third mixture.

18 Claims, 2 Drawing Sheets

INKJET INK AND METHOD FOR MAKING THE SAME

RELATED APPLICATIONS

This application claims all benefits accruing under 35 U.S.C. §119 from China Patent Application No. 201010619664.8, filed on Dec. 31, 2010 in the China Intellectual Property Office, hereby incorporated by reference.

BACKGROUND

1. Technical Field

The present disclosure relates to inkjet inks, and particularly, to an inkjet ink containing carbon nanotubes and a method for making the same.

2. Description of Related Art

Inkjet printing is a non-impact printing process in which droplets of inkjet ink are deposited on a substrate to form the desired image. The droplets are ejected from a print head in response to digital signals generated by a microprocessor. Inkjet printing can be especially advantageous for making unique prints or small lots.

An example is shown and discussed in U.S. Publication No. 2006/0130700A1, entitled, "SILVER-CONTAINING INKJET INK," published to Nicole M. Relnartz on Jun. 22, 2006. This publication discloses an inkjet ink comprising silver salt and a method for the fabrication of a conductive feature on a substrate. The method includes disposing an inkjet ink comprising silver salt on a substrate to form a feature and disposing a second inkjet ink on the substrate. The second inkjet ink includes a reducing agent capable of reducing silver salt to silver metal. The use of the reducing agent is a complicated and costly process. Furthermore, the prepared conductive lines are made up of non-uniform silver particle interconnected structures via the reduction of silver ions. Therefore, the thickness of the formation of conductive lines varies, and the conductive lines have poor conductivity.

What is needed, therefore, is to provide an alternative inkjet ink and a method for making the same.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
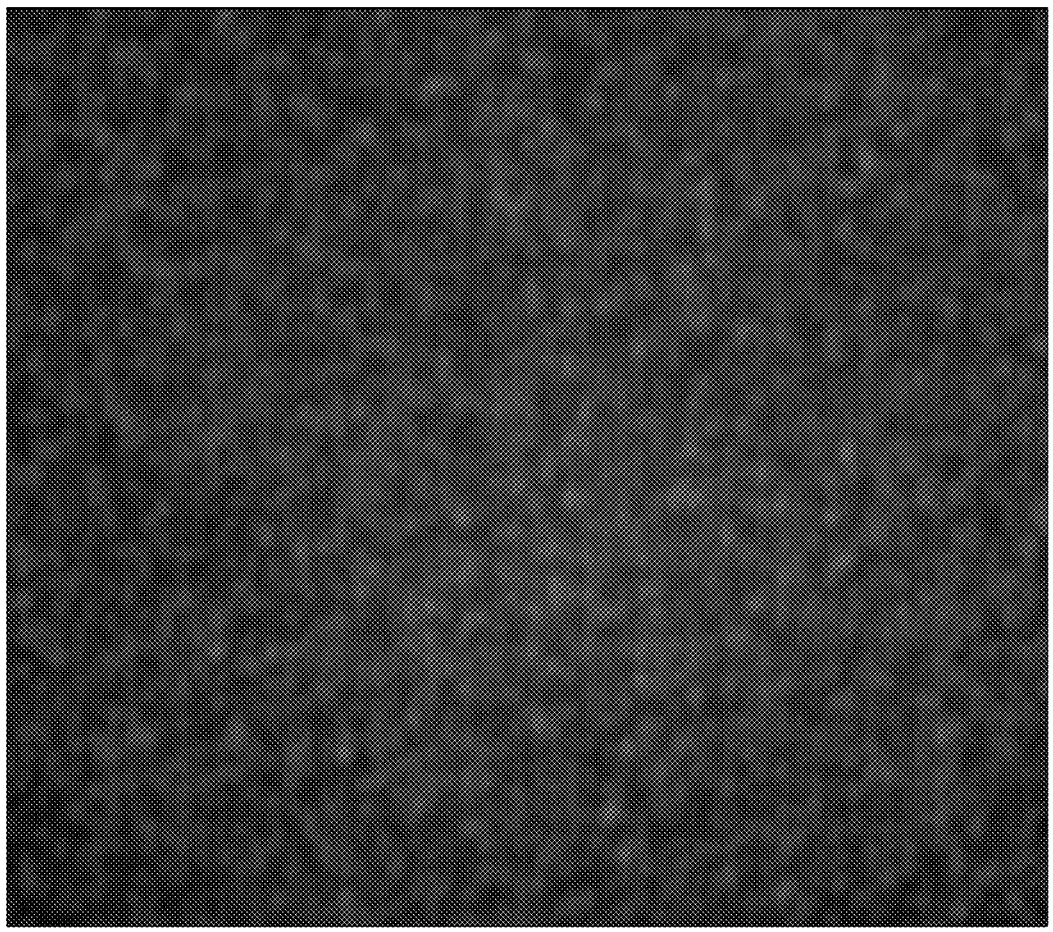
FIG. 1 is a field emission picture of a conductive film made by an inkjet ink of one embodiment.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

An inkjet ink of one embodiment is provided. The inkjet ink includes carbon nanotubes, flake graphites, an organic carrier, a binder, a surfactant, a film enhancer and a solvent. A weight percentage (wt %) of the carbon nanotubes is in a range from about 0.2 wt % to about 5 wt %. A wt % of the flake graphites is in a range from about 7 wt % to about 25 wt %. A wt % of the organic carrier is in a range from about 10 wt % to about 15 wt %. A wt % of the binder is in a range from about 5 wt % to about 25 wt %. A wt % of the surfactant is in a range from about 0.5 wt % to about 2 wt %. A wt % of the film enhancer is in a range from about 5 wt % to about 30 wt %. A wt % of the solvent is in a range from about 20 wt % to about 60 wt %.

The wt % of the carbon nanotubes in the inkjet ink cannot be too high. Otherwise, the carbon nanotubes cannot be uniformly dispersed in the inkjet ink, which may plug the inkjet printer nozzle. In one embodiment, the wt % of carbon nanotubes in the inkjet ink is in a range from about 0.5 wt % to about 5 wt %. The carbon nanotubes are substantially uniformly dispersed in the inkjet ink. Moreover, the carbon nanotubes in the inkjet ink are separate entities and are free of strong interactions between each other. Therefore, the carbon nanotubes in the inkjet ink will not plug the inkjet printer nozzle.

The carbon nanotubes in the inkjet ink can be single-walled carbon nanotubes, double-walled carbon nanotubes, multi-walled carbon nanotubes, or combinations thereof. A diameter of each of the carbon nanotubes can be less than 50 nanometers. A length of each of the carbon nanotubes can be in a range from about 2 micrometers to about 15 micrometers. In one embodiment, the diameter of each of the carbon nanotubes is less than 50 nanometers. The length of each of the carbon nanotubes is in a range from about 2 micrometers to about 5 micrometers. The carbon nanotubes with the length and the diameter described above can be easily dispersed, so as to not plug the inkjet printer nozzle.

Furthermore, the carbon nanotubes can be chemically functionalized, which refers to the carbon nanotubes can be chemically treated to introduce functional groups on the surface. Chemical treatments include, but are not limited to, oxidation, radical initiation reactions, and Diels-Alder reactions. The functional group can be any hydrophilic group, such as carboxyl (—COOH), aldehyde group (—CHO), amino (—$NH_2$), hydroxyl (—OH), or combinations thereof. The carbon nanotubes are soluble in the solvent provided by the functional groups.

Each of the flake graphites has a sheet shape with a size of less than 1 micrometer. The size of the flake graphites is measured by the greatest diameter of the flake graphites. Each of the flake graphites has a thickness in a range from about 10 nanometers to about 1 micrometer. Because the flake graphites have sizes less than 1 micrometer, the flake graphites are easily dispersed in the inkjet ink. The flake graphites can be adhered on the surfaces of the carbon nanotubes to increase the dispersion of the carbon nanotubes in the inkjet ink. The flake graphites have a good conductivity and low price, therefore the inkjet ink also has a good conductivity and low price.

The binder can be a water-soluble polymer binder, such as povidone, acrylic latex, vinyl acetate latex, polyethylene resin acetaldehyde concentration, or combinations thereof. The binder adheres onto the surface of the carbon nanotubes or the flake graphites. The inkjet ink is coated on a surface of a substrate in application. The binder can fix the carbon nanotubes or the flake graphites on a surface of the substrate after the solvent in the inkjet ink has evaporated. The binding force between the inkjet ink and the substrate can also be increased by increasing the wt % of the binder in the inkjet ink. In one embodiment, the binder is acrylic latex.

The organic carrier can be carboxymethyl cellulose, sodium polyacrylate, three styrene maleic acid resin, a high degree of substitution of carboxymethyl cellulose, or combinations thereof. The organic carrier can be used to help disperse the flake graphites in the inkjet ink. In one embodiment, the organic carrier is sodium polyacrylate.

The surfactant can be fatty acids, phosphate, modified polyvinyl alcohol, polydimethylsiloxane, sodium lauryl sulfate, sodium aliphatic polyester sulfone, polysorbate, or combinations thereof. The surfactant can help uniformly disperse the carbon nanotubes in the ink. In one embodiment, the surfactant is sodium aliphatic polyester sulfone.

The film enhancer can be a suspension made by dispersing colloidal silicate with titanium dioxide particles or silicon dioxide particles in a solvent. A wt % of the colloidal silicate in the film enhancer is in a range from about 1 wt % to about 50 wt %. A wt % of the titanium dioxide particles or silicon dioxide particles in the film enhancer is in a range from about 1 wt % to about 5 wt %. A wt % of the solvent in the film enhancer is in a range from about 45 wt % to about 80 wt %. The silicate can be sodium silicate, potassium silicate, or combinations thereof. In application, the film enhancer can enhance the binding force between the flake graphites and the substrate, or between the carbon nanotubes and the substrate, therefore the binding force between the inkjet ink can also be increased.

The above mentioned solvent can be water. In one embodiment, the solvent is deionized water.

The inkjet ink may further include a viscosity modifier with a wt % in a range form about 0.1 wt % to about 20 wt %. The viscosity modifier can be a water-soluble polymer, such as methanol, ethanol, cellulose ethers, guar gum, silica gel, or combinations thereof. In one embodiment, the viscosity modifier is cellulose ethers.

The inkjet ink may further include a moisturizing agent with a wt % in a range from about 0.1 wt % to about 40 wt %. The moisturizing agent can have a high boiling point. The moisturizing agent can be polypropylene glycols (PPG), glycol ethers, or combinations thereof. The moisturizing agent can raise the boiling point of the inkjet ink. The inkjet ink provided in one embodiment is not volatilizable at temperatures less than 50° C. In one embodiment, the moisturizing agent is glycol ethers.

The inkjet ink typically has a surface tension in a range from about 20 dyne/centimeter (dyn/cm) to about 70 dyn/cm, and in the range from about 20 dyn/cm to about 50 dyn/cm at 25° C. in one embodiment. A viscosity of the inkjet ink can be in a range from about 1 cps to about 40 cps at 25° C. It is understood that the inkjet ink can be coated on a substrate to form a pattern by a spin coating method if the inkjet ink has a higher viscosity. It is to be understood that the pattern can be electrical wires, electrodes, or field emission film, according to different applications.

In one embodiment, the inkjet ink includes about 1.5 wt % multi-walled carbon nanotubes, about 10 wt % flake graphites, about 20 wt % film enhancer, about 20 wt % binder, about 10 wt % organic carrier, about 0.5 wt % surfactant, and about 38 wt % de-ionized water. In one embodiment, the film enhancer includes about 40 wt % sodium silicate, about 5 wt % titanium dioxide, and about 55 wt % de-ionized water. In one embodiment, the surfactant is sodium aliphatic polyester sulfone. In one embodiment, the length of each multi-walled carbon nanotubes is 2 micrometers. In one embodiment, the diameter of each multi-walled carbon nanotubes is about 50 nanometers. In one embodiment, the organic carrier is carboxymethyl cellulose.

In another embodiment, the inkjet ink includes about 2 wt % multi-walled carbon nanotubes, about 18 wt % flake graphites, about 15 wt % film enhancer, about 25 wt % binder, about 10 wt % organic carrier, about 0.5 wt % surfactant, and about 29.5 wt % de-ionized water. In another embodiment, the organic carrier is sodium polyacrylate.

A conductive film can be printed on a surface of a substrate using the inkjet ink by a printing device. To test the binding force between the conductive film and the substrate, a tape is adhered on the conductive film and then removed from the conductive film. As shown in FIG. 1, the conductive film after tape treating shows good field emission property. Therefore, the inkjet ink has a good binding force with the substrate.

Figure 2:
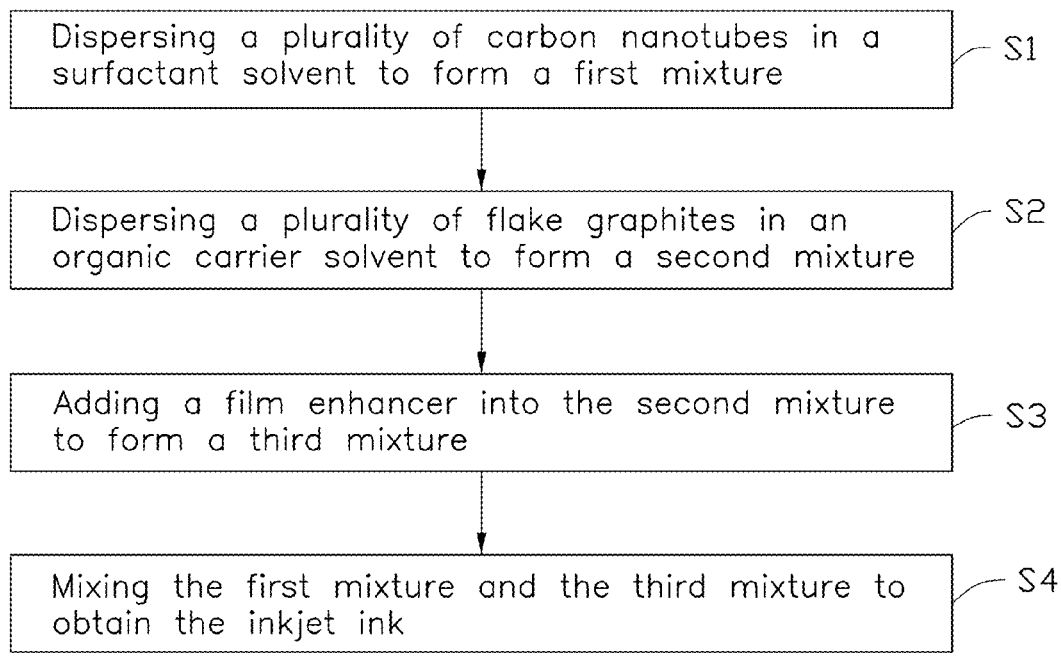
FIG. 2 is a flowchart of one embodiment of a method for making the inkjet ink in one embodiment.

Referring to FIG. 2, one embodiment of a method for making an inkjet ink includes:
(S1) dispersing a plurality of carbon nanotubes in a surfactant solvent to form a first mixture;
(S2) dispersing a plurality of flake graphites in an organic carrier solvent to form a second mixture;
(S3) adding a film enhancer into the second mixture to form a third mixture; and
(S4) mixing the first mixture and the third mixture to obtain the inkjet ink.

The step (S1) includes:
(S11) providing a surfactant and dissolving the surfactant into water to form a surfactant solvent;
(S12) adding the carbon nanotubes into the surfactant solvent; and
(S13) agitating the surfactant solvent comprising the surfactant and the carbon nanotubes for 10 minutes to 30 minutes to get the first mixture.

In step (S11), the surfactant can be fatty acids, phosphate, modified polyvinyl alcohol, polydimethylsiloxane, sodium lauryl sulfate, sodium aliphatic polyester sulfone, polysorbate, or combinations thereof. In one embodiment, the surfactant is sodium aliphatic polyester sulfone.

In step (S12), the carbon nanotubes can be obtained by any method, such as chemical vapor deposition (CVD), arc discharging, or laser ablation. In one embodiment, the carbon nanotubes can be obtained by providing a substrate, forming a carbon nanotube array on the substrate by CVD, and peeling the carbon nanotube array off from the substrate by a mechanical method, thereby achieving a plurality of carbon nanotubes.

The carbon nanotubes can be purified by the following steps:
heating the carbon nanotubes in air flow at about 350° C. for about 2 hours to remove amorphous carbons;
soaking the treated carbon nanotubes in about 36% hydrochloric acid for about one day to remove metal catalysts;
isolating the carbon nanotubes soaked in the hydrochloric acid;
rinsing the isolated carbon nanotubes with de-ionized water; and
filtrating the carbon nanotubes.

In step (S12), the carbon nanotubes can be treated by an acid. In one embodiment, refluxing the carbon nanotubes in nitric acid at about 130° C. for a period of time from about 4 hours to about 48 hours to form a suspension, centrifuging the suspension to form an acid solution and a carbon nanotube sediment, and rinsing the carbon nanotube sediment with water until the pH of the used water is about 7. The carbon nanotubes can be chemically modified with functional groups such as —COOH, —CHO, —NH$_2$, and —OH on the walls and the end portions thereof after the acid treatment. These functional groups can cause the carbon nanotubes to be soluble and dispersible in the solvent.

In step (S12), the functionalized carbon nanotubes can be treated by filtrating the carbon nanotubes, adding the carbon nanotubes to deionized water to obtain a mixture, ultrasonically stirring the mixture, and centrifuging the mixture. The above steps are repeated about 4 to 5 times to obtain a solution of carbon nanotubes and deionized water.

In step (S13), in one embodiment, the agitating time is about 30 minutes.

The step (S2) includes:
(S21) providing an organic carrier and dissolving the organic carrier into water to form an organic carrier solvent;
(S22) adding the flake graphites into the organic carrier solvent; and
(S23) agitating the solvent comprising the organic carrier and the flake graphites for about 10 minutes to about 30 minutes to achieve the second mixture.

In step (S21), in one embodiment, the organic carrier is sodium polyacrylate.

In step (S3), in one embodiment, the film enhancer is a suspension made by dispersing colloidal silicate with titanium dioxide particles in water. The wt % ratio of the colloidal silicate and the titanium dioxide particles is about 10:1.

A binder can be added in step (S4). The binder can be povidone, acrylic latex, vinyl acetate latex, polyethylene resin acetaldehyde concentration, or combinations thereof. In one embodiment, the binder is vinyl acetate latex.

Additionally, a viscosity modifier can be added in step (S4). The viscosity modifier can be a water-soluble polymer, such as methanol, ethanol, cellulose ethers, guar gum, silica gel, or combinations thereof. In one embodiment, the viscosity modifier is cellulose ethers.

Furthermore, a moisturizing agent can be added in step (S4). The moisturizing agent can be polypropylene glycols (PPG), glycol ethers, or combinations thereof. In one embodiment, the moisturizing agent is glycol ethers.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps described below may be removed, others may be added, and the sequence of steps may be altered. It is also to be understood that the above description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. An inkjet ink, comprising a plurality of carbon nanotubes, a plurality of flake graphites, an organic carrier, a binder, a surfactant, a film enhancer, and a solvent, wherein the film enhancer is a suspension comprising a colloidal silicate, titanium dioxide or silicon dioxide particles, and water.

2. The inkjet ink as claimed in claim 1, wherein the carbon nanotubes are chemically functionalized carbon nanotubes comprising a plurality of functional groups disposed on surfaces of the carbon nanotubes.

3. The inkjet ink as claimed in claim 2, wherein the functional groups are hydrophilic groups selected from the group consisting of carboxyl (—COOH), aldehyde group (—CHO), amino (—NH2), hydroxyl (—OH), and combinations thereof.

4. The inkjet ink as claimed in claim 1, wherein a weight percentage of the carbon nanotubes is in a range from about 0.2 weight percent (wt %) to about 5 wt %, a weight percentage of the flake graphites is in a range from about 7 wt % to about 25 wt %, a weight percentage of the organic carrier is in a range from about 10 wt % to about 15 wt %, a weight percentage of the binder is in a range from about 5 wt % to about 25 wt %, a weight percentage of the surfactant is in a range from about 0.5 wt % to about 2 wt %, a weight percentage the film enhancer is in a range from about 5 wt % to about 30 wt %, a weight percentage of the solvent is in a range from about 20 wt % to about 60 wt %.

5. The inkjet ink as claimed in claim 4, further comprising a viscosity modifier and a moisturizing agent, wherein a weight percentage of the viscosity modifier is in a range from about 0.1 wt % to about 20 wt %, a weight percentage of the moisturizing agent is in a range from about 0.1 wt % to about 40 wt %.

6. The inkjet ink as claimed in claim 5, wherein the viscosity modifier is selected from the group consisting of methanol, ethanol, cellulose ethers, guar gum, silica gel, and combinations thereof.

7. The inkjet ink as claimed in claim 5, wherein the moisturizing agent is selected from the group consisting of polypropylene glycols, glycol ethers, and combinations thereof.

8. The inkjet ink as claimed in claim 1, wherein the binder is selected from the group consisting of povidone, acrylic latex, vinyl acetate latex, polyethylene resin acetaldehyde concentration, and combinations thereof.

9. The inkjet ink as claimed in claim 1, wherein the organic carrier is selected from the group consisting of carboxymethyl cellulose, sodium polyacrylate, three styrene maleic acid resin, and combinations thereof.

10. The inkjet ink as claimed in claim 1, wherein the surfactant is selected from the group consisting of fatty acids, phosphate, polydimethylsiloxane, sodium lauryl sulfate, sodium aliphatic polyester sulfone, polysorbate, and combinations thereof.

11. The inkjet ink as claimed in claim 1, wherein the solvent is deionized water.

12. The inkjet ink as claimed in claim 1, wherein a weight percentage of the colloidal silicate in the film enhancer is in a range from about 1 wt % to about 50 wt %, and a weight percentage of the titanium dioxide or silicon dioxide particles in the film enhancer is in a range from about 1 wt % to about 5 wt %.

13. The inkjet ink as claimed in claim 1, wherein the colloidal silicate is selected from the group consisting of sodium silicate, potassium silicate, and combinations thereof.

14. An inkjet ink, comprising a plurality of carbon nanotubes, a plurality of flake graphites, an organic carrier, a surfactant, a film enhancer, a viscosity modifier, a moisturizing agent, and a solvent, wherein the film enhancer is a suspension comprising a colloidal silicate, titanium dioxide or silicon dioxide particles, and water.

15. The inkjet ink as claimed in claim 14, wherein a weight percentage of the colloidal silicate in the film enhancer is in a range from about 1 wt % to about 50 wt %, and a weight percentage of the titanium dioxide or silicon dioxide particles in the film enhancer is in a range from about 1 wt % to about 5 wt %.

16. The inkjet ink as claimed in claim 14, wherein the silicate is selected from the group consisting of sodium silicate, potassium silicate, and combinations thereof.

17. A method for making an inkjet ink, comprising:
providing a plurality of carbon nanotubes, a surfactant solvent, a plurality of flake graphites, an organic carrier solvent, and a film enhancer;
forming a first mixture by dispersing the plurality of carbon nanotubes in the surfactant solvent;
forming a second mixture by dispersing the plurality of flake graphites in the organic carrier solvent;
forming a third mixture by adding the film enhancer into the second mixture; and
mixing the first mixture and the third mixture.

18. The method as claimed in claim 17, wherein the film enhancer is a suspension made by dispersing colloidal silicate with titanium dioxide particles in water, and a wt % ratio of the colloidal silicate and the titanium dioxide particles is about 10:1.

* * * * *